(12) United States Patent
Nikkanen et al.

(10) Patent No.: US 7,733,391 B2
(45) Date of Patent: Jun. 8, 2010

(54) METHOD AND SYSTEM FOR BLACK-LEVEL CORRECTION ON DIGITAL IMAGE DATA

(75) Inventors: Jarno Nikkanen, Tampere (FI); Ossi Kalevo, Toijala (FI); Juha Alakarhu, Tampere (FI)

(73) Assignee: Nokia Corporation, Espoo (FI)

( * ) Notice: Subject to any disclaimer, the term of this patent is extended or adjusted under 35 U.S.C. 154(b) by 351 days.

(21) Appl. No.: 11/807,900

(22) Filed: May 29, 2007

(65) Prior Publication Data

US 2008/0297816 A1    Dec. 4, 2008

(51) Int. Cl.
*H04N 9/64* (2006.01)

(52) U.S. Cl. .................. 348/246; 348/243; 348/245; 348/251

(58) Field of Classification Search ............. 348/228.1, 348/229.1, 234, 241–261, 379; 358/1.9, 358/3.22
See application file for complete search history.

(56) References Cited

U.S. PATENT DOCUMENTS 5,008,739 A * 4/1991 D'Luna et al. ............ 348/246
7,088,388 B2 * 8/2006 MacLean et al. ........... 348/234
2005/0285952 A1 * 12/2005 Kwon et al. ............... 348/234
2007/0273775 A1 * 11/2007 Jiang ........................ 348/244

* cited by examiner

*Primary Examiner*—Tuan Ho
*Assistant Examiner*—Don Nguyen
(74) *Attorney, Agent, or Firm*—Ware, Fressola, Van Der Sluys & Adolphson, LLP (57) ABSTRACT

The black level in raw image data captured from an image sensor does not always stay fixed at a constant level, but may change as a function of the analog gain and exposure time and may vary from one spatial location of the pixels to another. To carry out black-level correction on the raw image data, the black level of each of the color components is measured at one or more sampling locations. A look-up table is generated based on the measured black levels and a computation module is used to carry out black-level correction based on the information stored in the look-up table. The look up table may have information indicative of the analog gain level and the exposure time and the variations of black-levels in different spatial locations.

15 Claims, 7 Drawing Sheets

LUT for calculating ca(AG), multiplicative

| AG | ca |
|---|---|
| 1.0 | 1.0 |
| 8.0 | 8.0 |

| Analog gain | Measured black level (10bit values): | | | | | | | | | | | | |
|---|---|---|---|---|---|---|---|---|---|---|---|---|
| | S1 | | | | S2 | | | | S3 | | | |
| | C1 | C2 | C3 | C4 | C1 | C2 | C3 | C4 | C1 | C2 | C3 | C4 |
| x1 | 64 | 64 | 64 | 64 | 64 | 64 | 64 | 64 | 64 | 65 | 64 | 64 |
| x2 | 63 | 64 | 64 | 63 | 64 | 65 | 64 | 64 | 65 | 66 | 65 | 65 |
| x4 | 62 | 64 | 62 | 62 | 64 | 66 | 64 | 64 | 66 | 68 | 66 | 66 |
| x8 | 60 | 64 | 60 | 60 | 64 | 68 | 64 | 64 | 68 | 72 | 68 | 68 |

(B)

Component order in LUT:

| left border of image | | middle of image | | right border of image | |
|---|---|---|---|---|---|
| C1 | C2 | C1 | C2 | C1 | C2 |
| C3 | C4 | C3 | C4 | C3 | C4 |

(C)

LUT for calculating cs(x,y), floating point representation

| 0.5 | 0.0 | 0.0 | -0.5 | -0.5 | -1.0 |
|---|---|---|---|---|---|
| 0.5 | 0.5 | 0.0 | 0.0 | -0.5 | -0.5 |

(D)

LUT for calculating cs(x,y), one byte per value, 1 sign bit, 4 integer bits and 3 fractional bits

| 4 | 0 | 0 | -4 | -4 | -8 |
|---|---|---|---|---|---|
| 4 | 4 | 0 | 0 | -4 | -4 |

METHOD AND SYSTEM FOR BLACK-LEVEL CORRECTION ON DIGITAL IMAGE DATA

FIELD OF THE INVENTION

The present invention relates generally to digital camera imaging and, more particularly, to processing of raw imaging data, such as Bayer data.

BACKGROUND OF THE INVENTION

It is known in the art that the outputs of a digital camera sensor have some non-zero level even in the case when no light reaches the sensor surface. This non-zero level is caused, for example, by dark current that accumulates electrical charges into the pixels independently of the amount of light that reaches the sensor surface. The dark current usually increases with temperature. The total amount of accumulated charges also increases as a function of exposure time and the final output signal from the camera sensor may also be affected by the analog gain of the camera. This non-zero level in the sensor outputs is also known as the black level. Typically there is circuitry in the camera sensor to normalize the black level at some pre-determined fixed level. Unfortunately in many cases there remains some difference between the target level and actual level. In order to produce correct colors and intensity levels in the final image, it is necessary to determine a more accurate black level so that it can be removed from the raw data.

SUMMARY OF THE INVENTION

In an image sensor wherein the black level in the raw data does not stay fixed at a constant level, the present invention provides a method and apparatus for carrying out black-level correction on the raw image data. The black level may change as a function of the analog gain and exposure time. The black level may vary from one spatial location of the pixels to another.

Accordingly, the first aspect of the present invention is a method for black-level correction. The method comprises:

measuring a black level of each of a plurality of color sensing components in an image sensor at least at one sampling location; and generating a look-up table based on the black level separately measured from the color sensing components so that black-level correction on the raw image data is based on the look-up table.

For taking into account the effects of the analog gain on the black-level, the look-up table also has information indicative of the analog gain level so that the black-level correction on the raw image data is also based on the information.

For taking into account of the effects of exposure time on the black-level, the look-up table also has information indicative of the exposure time so that the black-level correction on the raw image data is also based on the exposure time.

For taking into account the effects of pixel locations on the black-level, the look-up table also has information indicative of the spatial locations so that the black-level correction on the raw image data is also based on the information.

When black-level measurement is carried out at a plurality of sampling locations, interpolation or extrapolation of black-levels measured at one or more sampling locations may be used for black-level correction, and the look-up table is generated based on the black level measured at said plurality of sampling locations so that the black-level correction on the image data at different spatial locations is based on black levels measured at least at some of said plurality of sampling locations.

When an image is reconstructed in an image reconstruction pipeline based on the raw image data, the black-level correction on the image data can be carried out in the image reconstruction pipeline.

The second aspect of the present invention is an apparatus for use with an image sensor. The apparatus comprises:

a look-up table for storing information indicative of black levels measured at least at one sampling location on an image sensor, wherein the measured black levels include the black level of each of a plurality of color sensing components in the image sensor at the sampling location; and a computation module, operatively connected to the look-up table, for retrieving the information so that black-level correction on the raw image data is based on the information.

The look-up table can be stored in a computer readable storage medium in an imaging device, for example.

The third aspect of the present invention is a device, such as a digital camera, a mobile phone or the like. The device, comprises:

an image sensor;

an optical unit for forming an image on the image sensor;

a storage medium for storing a look-up table, wherein the look-up table has information indicative of black levels measured at least at one sampling location on the image sensor, wherein the measured black levels include the black level of each of a plurality of color sensing components in the image sensor at the sampling location; and a computation module adapted to receive raw image data from the image sensor and to retrieve information from the look-up table so as to carry out black-level correction on the raw image data based on the information.

According to the present invention, the device further comprises:

a gain control module for controlling the analog gain level of the image sensor when the raw image data is captured, wherein the look-up table comprises information indicative of the gain level so that the black-level correction on the raw image data is also based on the information.

According to the present invention, the device further comprises:

a time control module for setting an exposure time for capturing the raw image data, wherein the look-up table comprises information indicative of the exposure time so that the black-level correction on the raw image data is also based on the exposure time.

According to the present invention, the look-up table further comprises information indicative of the spatial locations of pixels from which the raw image data is obtained so that the black-level correction on the raw image data is also based on the information.

The device may include an image reconstruction pipeline for reconstructing an image based on the raw image data, wherein the black-level correction on the image data is carried out in the image reconstruction pipe line.

The present invention will become apparent upon reading the description taken in conjunction with FIGS. 1 to 11.

DETAILED DESCRIPTION OF THE INVENTION

In most of the camera sensors that are used in digital cameras, including those disposed in a mobile phone, the black level in the raw data does not stay fixed at a constant level. It is likely that the black level changes as a function of the analog gain and exposure time. Furthermore, the black level may vary from one spatial location of the pixels to another. As the pixel size decreases and the pixel count increases, the variation in the black level is expected to become more significant. Accordingly, the black level in the raw image data does not stay fixed at a predetermined level throughout the image area.

In most cases, data pedestal or black level for even and odd lines and columns needs to be considered separately. This means that the color components of a typical Bayer color-filter array (CFA) sensor also need to be considered separately, mainly because of the difference between even and odd lines and columns and not because of the color filters. For that reason, any references to different color components herein are made to distinguish between the four different types of pixel coordinates: even line and even column; even line and odd column; odd line and even column and odd line and odd column. In a more detailed analysis of the black level variation, the differences between the pedestal levels of color components should also be considered.

According to one embodiment of the present invention, the treatment of black level consists of two general stages:

1) General reference look-up tables (LUTs) on the basis of specific test images that are captured with the type of camera sensor that needs advanced black-level correction. The LUTs can be generated when the image processing software in the R&D phase is tuned to a specific camera sensor model. The LUT for each sensor sample can also be generated automatically during product testing, in case there is significant variation between sensor samples.

2) Elimination of the black level from the raw data captured by the camera sensor based on the LUT. Black-level correction can be carried out automatically in the product by the image reconstruction pipeline (IRP) each time an image is captured. As black-level correction takes place first in the IRP, the accuracy of the rest of image processing is improved because the image data contains less unwanted non-linearity that is caused by the black-level offset.

Figure 1:
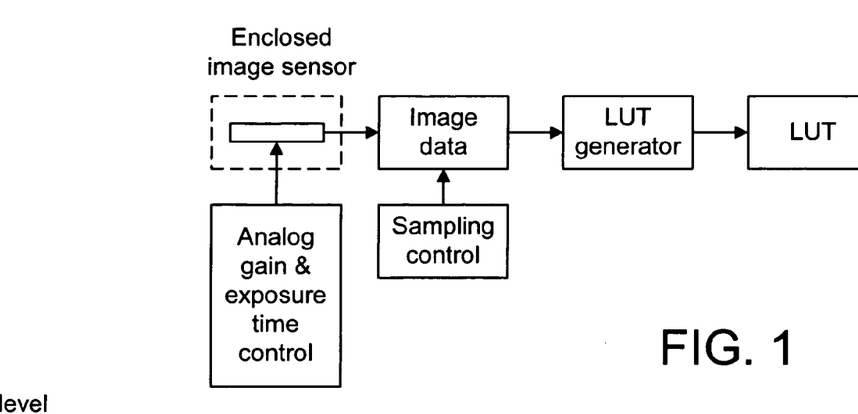
FIG. 1 illustrates a system for generating a look-up table for black-level correction purposes.

The process of generating an LUT for a camera sensor is illustrated in FIG. 1. As shown in FIG. 1, an imaging sensor placed in a dark enclosure is used to capture an image without light. A sampling control module is used to specify the sampling locations at which a data pedestal is obtained. In the LUT generation phase, an image processing software is tuned for a specific image sensor model. For example, if the black-level value for a particular image sensor model does not vary significantly with spatial locations, then it may be sufficient to collect data pedestals at only one sampling location, with one pedestal for one color component. If the black-level value varies significantly from one spatial location to another, then spatial sampling in one or two dimensions may be required. Furthermore, if the black-level value in the image sensor varies with the analog gain of the camera and/or the exposure time, then an analog gain and exposure time control is also used in the generation of an LUT including the dependency of the data pedestals on analog gain and exposure time. It may also be necessary to control the temperature of the image sensor if the black-level value varies with temperature.

It is understood that the sampling control and analog gain and exposure time control in the LUT generation phase, as illustrated in FIG. 1, can be carried out by a software application product having programming codes embedded in a computer readable storage medium. The same software application product can also be used to generate the LUT according to the sampling location, the analog gain and the exposure time, for example. The LUT can be stored in the same storage medium or a different storage medium in the black-level offset module.

Figure 2:
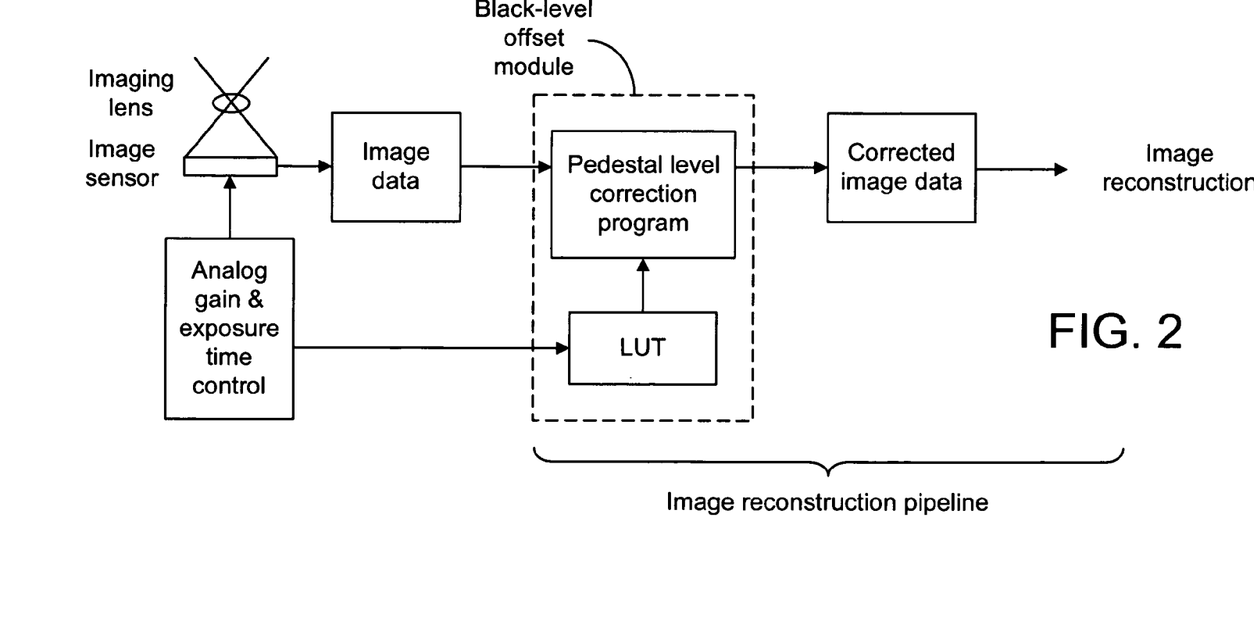
FIG. 2 illustrates a system for correcting black-level in an image using a look-up table.

FIG. 2 shows a system for correcting the black-level in an image using a look-up table as carried out at the second phase of the present invention. Black-level correction can be carried out automatically in the product by the image reconstruction pipeline (IRP) each time an image is captured. As shown in FIG. 2, the image formed by an imaging lens on the image sensor is read out as image data. The image data is conveyed to a black-level offset module for run-time correction, where the pixel value $I_{x,y}$ at a location (x,y) is adjusted by removing a pedestal level $ped_{x,y}$ for the location (x,y). Based on the stored information in the LUT, the pedestal level $ped_{x,y}$ can be computed for the image sensor. If the black-level value in the image sensor varies with the analog gain of the camera and/or the exposure time, then the analog gain and exposure time information is also used in the black-level offset module. If the black-level value varies significantly with temperature, it may be necessary to use a measurement device in the camera to read the temperature so as to allow the pedestal level correction program to take into account the temperature when the image data is adjusted.

It is understood that the pedestal level correction in the black-level offset module, as illustrated in FIG. 2, can be carried out by a software application product having programming codes embedded in a computer readable medium. The software application product automatically adjusts the image data based on the LUT according to the pixel location, the analog gain and the exposure time, for example.

In general, if the raw image data on a pixel at a location (x,y) is $I_{x,y}$, then the corrected image data after black-level correction is:

$$Icorr_{x,y} = I_{x,y} - ped_{x,y} \quad (1)$$

This pedestal level can be calculated by adding a correction value $C_{x,y,AG,ET}$ to a target pedestal level $tgtped_{x,y}$ as follows:

$$ped_{x,y} = tgtped_{x,y} + C_{x,y,AG,ET} \quad (2)$$

The target pedestal level $tgtped_{x,y}$ for a color component can be obtained from the address in some form of sensor registers. Typically a camera sensor has circuitry that uses light-shielded pixels for normalizing the pedestal level into a fixed target level, and the target level can be read from the sensor register address. In a SMIA (Standard Mobile Imaging Architecture) sensor, data pedestal registers are provided in a read-only memory unit to specify the target pedestal value for a captured image. In general, the correction value $c_{x,y,AG,ET}$ is a combination of spatial-dependent correction value $cs_{x,y}$, analog-gain dependent correction value $ca_{AG}$, and exposure-time dependent correction value $ce_{ET}$.

If $ca_{AG}$ is multiplicative, then the error caused by the spatial-dependent correction value and the exposure-time dependent correction value are changed by the analog gain dependent correction value in a multiplicative manner. Thus, $$c_{x,y,AG,ET} = ca_{AG}(cs_{x,y} + ce_{ET}) \quad (3)$$

If, however, the exposure-time dependent correction value is not changed by the analog gain dependent correct value, we have $$c_{x,y,AG,ET} = ca_{AG} * cs_{x,y} + ce_{ET} \quad (4)$$

If the analog gain dependent correction value is only additive, we have $$c_{x,y,AG,ET} = ca_{AG} + cs_{x,y} + ce_{ET} \quad (5)$$

It should be noted that any or all of the terms $ca_{AG}$, $cs_{x,y}$ and $ce_{ET}$ may be omitted from $c_{x,y,AG,ET}$ for a sensor if data pedestal does not have dependency on the corresponding factor. It should also be noted that only $cs_{x,y}$ is position dependent and can have multiple values (matrix) when image is corrected. $ca_{AG}$ and $ce_{ET}$ are constants for the image and their values can be defined from the LUT based on the used analog gain and exposure time for that image. The LUT can be representing as a piece-wise linear values pair.

Spatial-Dependent Correction Value

The correction value $cs_{x,y}$ for a pixel location (x,y) is generally calculated in accordance with the sensor used in the imaging device. It can be calculated according to an LUT that has zero, one or two degrees of freedom.

Figure 3:
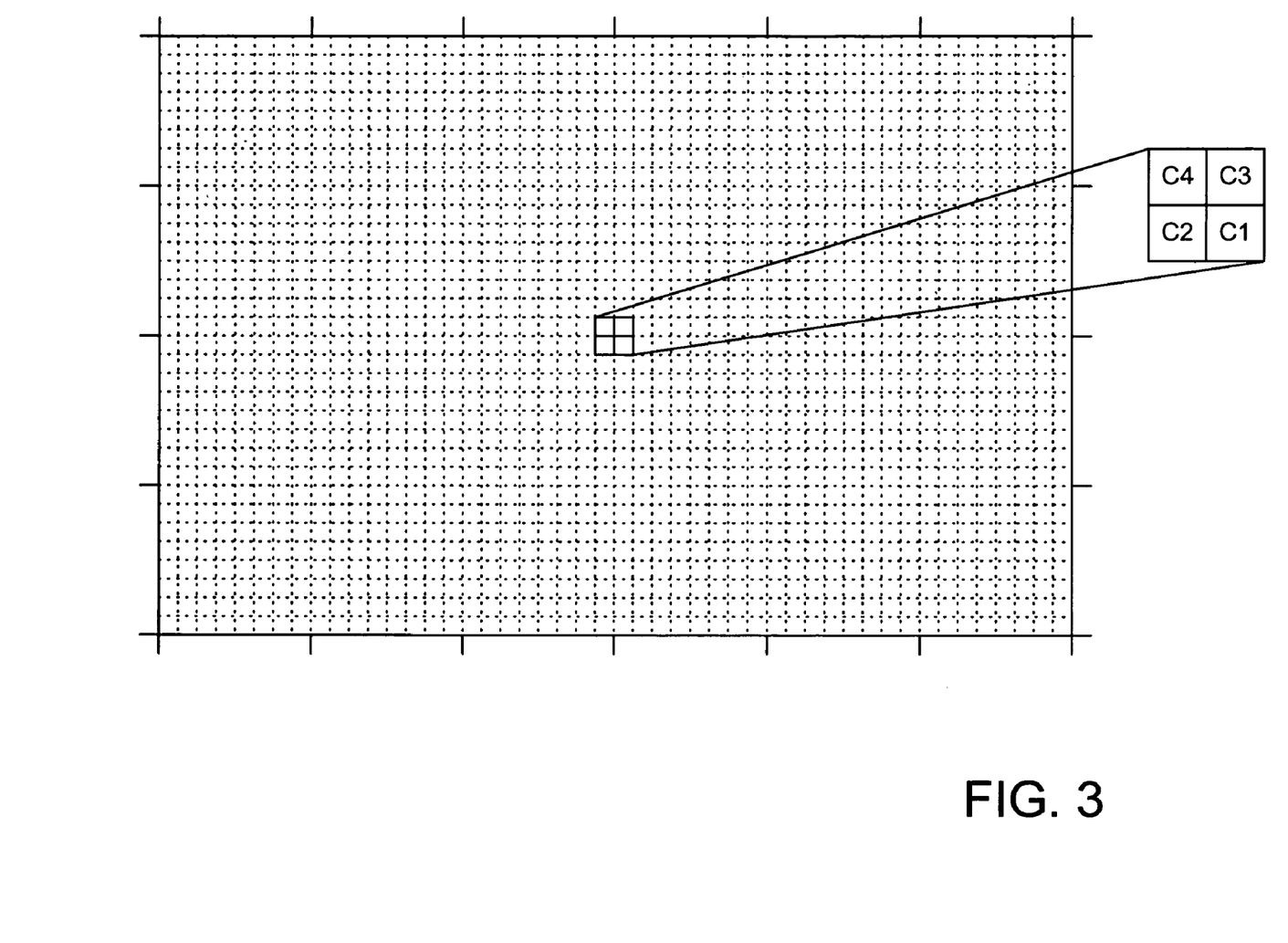
FIG. 3 illustrates a way to obtain the target pedestal value where spatial correction is not needed.

FIG. 3 illustrates the generation of an LUT having zero degree of freedom. In this case, the black-level value does not significantly vary with spatial locations. Although spatial correction is not needed, the black-level values at four spatial locations are obtained to take into account the locations for the color filters in a typical Bayer color-filter array (CFA) sensor. Here C1 to C4 represent the different color components at different line/column indices. For example C1 represents the color component located at an odd line and an odd column; C2 represents the color component located at an odd line and an even column; C3 represents the color component located at an even line and an odd column and C4 represents the color component located at an even line and an even column. For each color component, the target pedestal value is corrected according to the average pedestal level of that color component. Thus, the same pedestal value is used for all pixels that correspond to the same color component. For example, the correction value is the deviation of the global average pedestal level of a color component from the set target pedestal level. The correction value that indicates the deviation from the target level needs to have bigger bit depth than the raw image data, because the deviation can be less than one digit. In one typical case (equation 3) the deviation is multiplied by analogue gain ($ca_{AG}$ equals analogue gain and term $ce_{ET}$ is zero), so less than one digit deviation is insignificant when +0 dB analogue gain is used, but it becomes significant with higher analogue gains. For example, 10 bit raw data could have target pedestal of 64, but the actual pedestal of 64.5. With ×8 analogue gain (roughly +18 dB) the true pedestal would become 64+8*0.5=68. So in the example case the deviations in the LUT could be represented with data that has bit depth of 16 bits, instead of the bit depth of the raw data (10 bits in this example). It is also possible that correction values in the LUT are not able to represent full dynamic of the pixels (10 bits in this example) and e.g. 8 bit values are used to representing correction values below 32 and so the format of data is 5.3 u. An LUT is required only if the black-level varies with analog gain and/or the exposure time. Otherwise, a single target pedestal level for each color component can be included in the pedestal level correction program.

Figure 4:
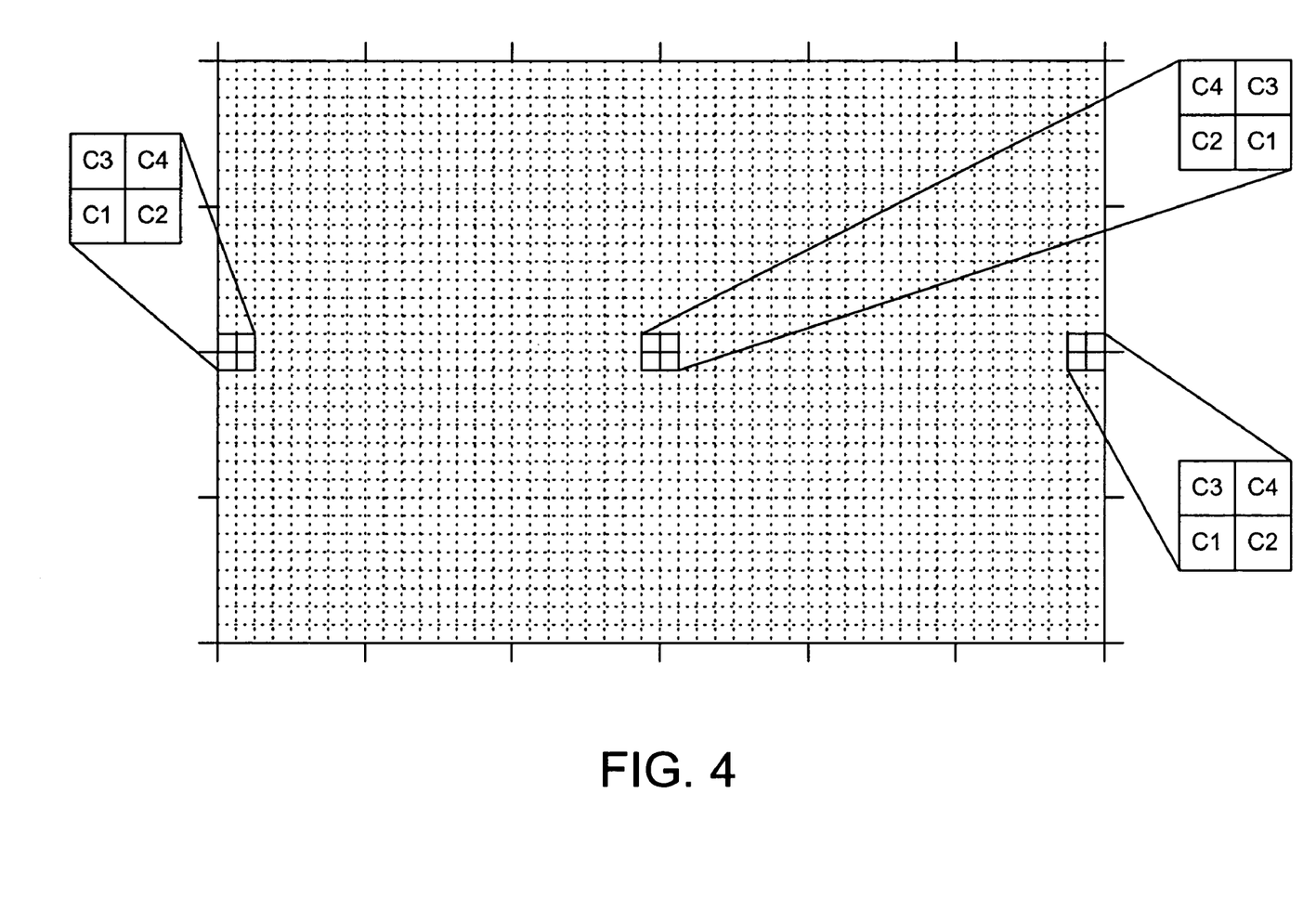
FIG. 4 illustrates a way to obtain the target pedestal value where pedestal varies between columns.

FIG. 4 illustrates the generation of an LUT having one degree of freedom. In this case, the black-level value varies with spatial locations in one dimension, either in lines or in columns. Accordingly, spatial sample in one dimension is required. As illustrated in FIG. 4, pedestal varies only along a row or line. For example, three or more sampling locations for each color component are used. For each color component, the target pedestal value is corrected according to the row or column index. Linear or non-linear interpolation may be needed for the pixel locations that are between sampling locations. In general, when many spatial locations are used in the computation and the black-level shift is reasonably linear, linear interpolation is adequate. A correction value is taken as the deviation of the local average (around the sampling location) pedestal level of a color component from the set target pedestal level. Thus, correction values for each color component are stored in a one-dimensional LUT for spatial correction purposes. It should be noted that the correction value is the target value minus the measured value, for example.

Figure 5:
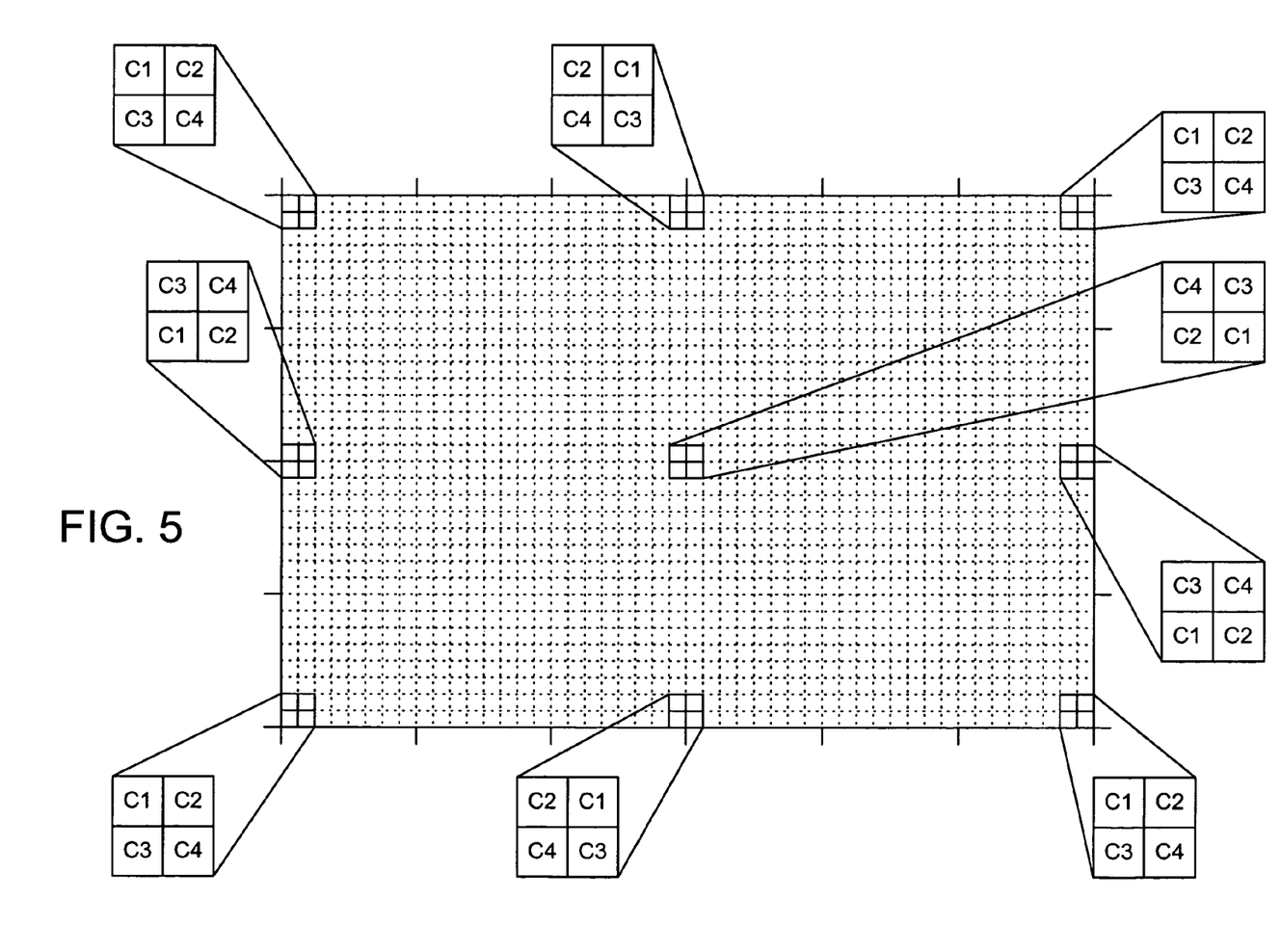
FIG. 5 illustrates a way to obtain the target pedestal value where two-dimensional spatial sampling is needed.

FIG. 5 illustrates the generation of an LUT having two degrees of freedom. In this case, the black-level value varies with spatial locations in two dimensions, both in lines and in columns. Accordingly, spatial sample in two dimensions is required. As illustrated in FIG. 5, pedestal varies both along a row and along a column. For example, nine or more sampling locations for each color component are used. For each color component, the target pedestal value is corrected according to the row or column index. Linear interpolation may be needed for the pixel locations that are between sampling locations. A correction value is taken as the deviation of the local average (around the sampling location) pedestal level of a color component from the set target pedestal level. Correction values are stored in a two-dimensional LUT for spatial correction purposes. Again, the correction value is the target value minus the measured value, for example.

In practice, a LUT may contain signed 8-bit integer values, each of which represents a correction offset from the target pedestal level for a color component in a sampling location inside an image area. Depending on the resolution (number of bits) of the correction offset as compared to the resolution of the raw data, it may be necessary to reduce the resolution of the correction offset before mapping the correction offset domain into the raw data domain. In order to reduce the effect of noise, the correction offsets can be calculated from multiple pixels that correspond to the same color component and located around the sampling location. Interpolation from two or more closest sampling locations in the surrounding pixel area can be used. An example of how interpolation is carried out is described later in conjunction with FIG. 11. Alternatively, the correction value at a sampling location is computed from a number of reference image frames at the same location. All reference image frames are dark raw frames captured with light being blocked from the image sensor.

It should be noted that, in some image sensors, each of the color components in a pixel are arranged at different spatial locations in the (x,y) coordinates. In some image sensors, however, two or more color components may be arranged in a stack configuration with one or more color filters disposed between the color components. In such cases, C1 to C4 may reside in the same line and the same column, but the method for black-level measurement and black-level correction on the raw image data, according to the present invention, is still applicable. Moreover, the target pedestal level tgtped$_{x,y}$ in Equation 2 may be different for different color components but the target pedestal level can be only one constant for all color components. Thus, the target pedestal is global for the image. It does not vary spatially.

Figure 6:
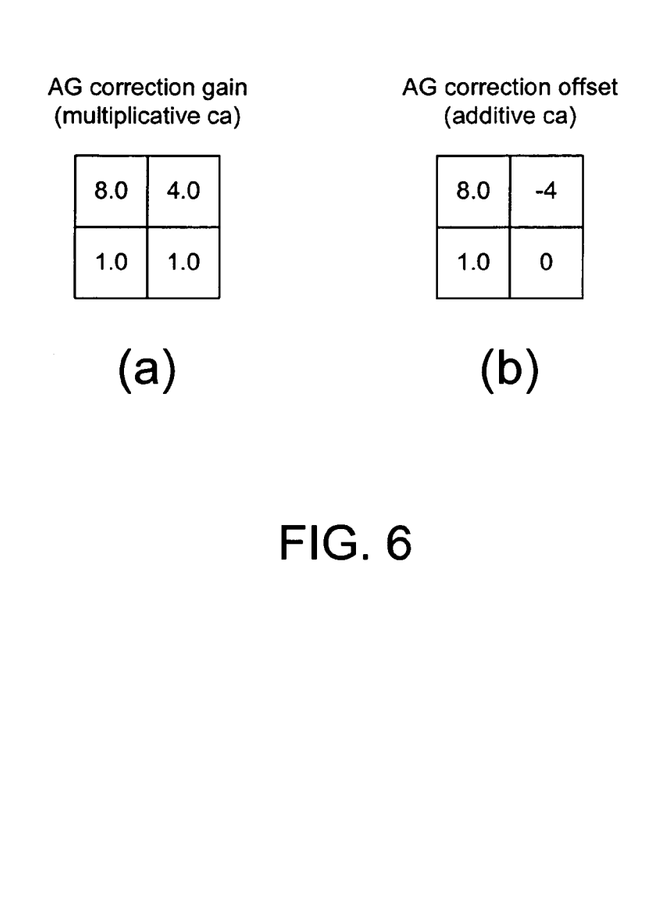
FIG. 6a illustrates an LUT for analog gain correction where the correction value is multiplicative.
FIG. 6b illustrates an LUT for analog gain correction where the correction value is additive.

FIG. 6a and FIG. 6b illustrate a 2×2 LUT for use in analog gain (AG) dependent correction. The analog gain-dependent correction LUT can be generated by capturing dark frames at different analog gain settings to determine whether the black-level varies as a function of analog gain. Correction values for the analog gain that are not included in the LUT can be obtained by linear or non-linear interpolation or extrapolation, for example. Typically, the needed correction changes linearly as a function of the gain. Thus, it is typically sufficient to include in the pedestal level correction program one correction value for minimum gain and one correction value for maximum gain. In a simplest case, the analog gain correction values are treated as additive correction values. These values can be represented by signed 8-bit integer values, for example. In interpolation or extrapolation, another 8-bit value can be used to represent the fractional part in the calculation, for example.

The exposure time-dependent correction LUT can be generated in a similar manner. The exposure gain correction value ce$_{ET}$ is primarily used as an additive correction value. Because of the relatively small size of the LUT, it is possible to assign more bits to represent a correction value. The LUTs can contain as many values as they are needed to represent the effect of piecewise linear value pairs.

Figure 7:
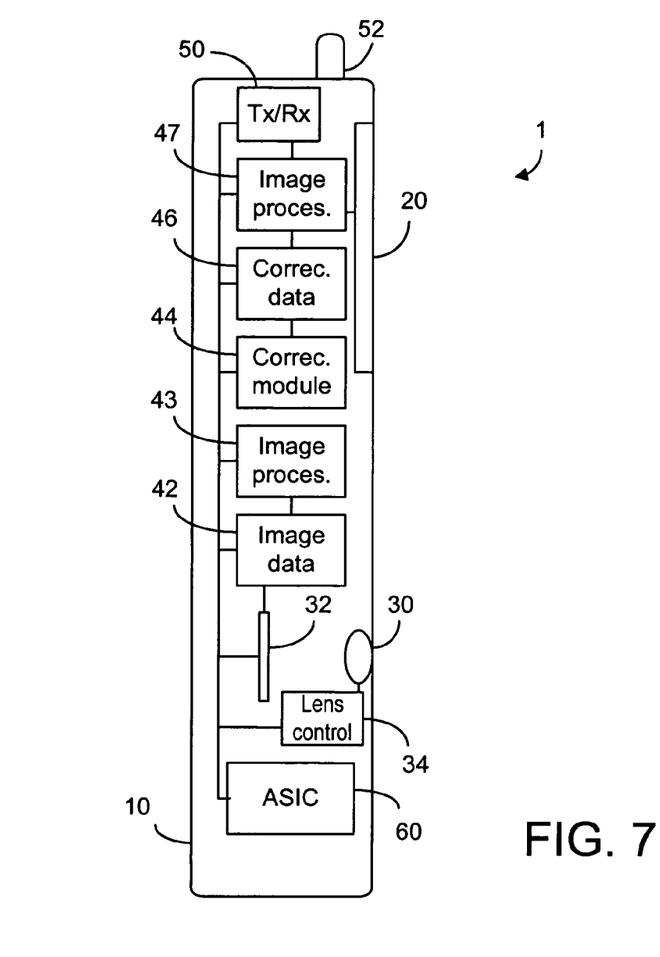
FIG. 7 is a schematic representation of an electronic device capable of black-level correction, according to the present invention.

The black-level correction method and system of the present invention can be used in a digital camera or an electronic device having digital imaging capability. As shown in FIG. 7, the electronic device 1 has a housing 10 to accommodate a plurality of electronic components. The electronic components include an image display module 20, an imaging lens 30, an image sensor 32 disposed at the image plane of the imaging lens 30. An image formed by the imaging lens 30 on the image sensor 32 can be read out as raw image data 42. The raw image data is processed by an image processing module 43 and the processed image data is conveyed to a black-level correction module 44 so that the pixel values in the image data are adjusted by corresponding spatial-dependent correction values and possibly the analog gain, exposure and temperature dependent correction values. The corrected image data 46 is further processed by another image processing module 47 so that the image data can be displayed on the display module 20 or transmitted through an antenna 52 via a transceiver 50. The black-level correction process is controlled by an ASIC 60. The electronic device 10 may have a lens control 34 for adjusting the focus of the image lens 30 or for adjusting the lens position for optical zoom purposes. The black-level correction module 44 comprises one or more LUTs.

The electronic device 1 can be a mobile terminal, a PDA or the like.

Figure 8:
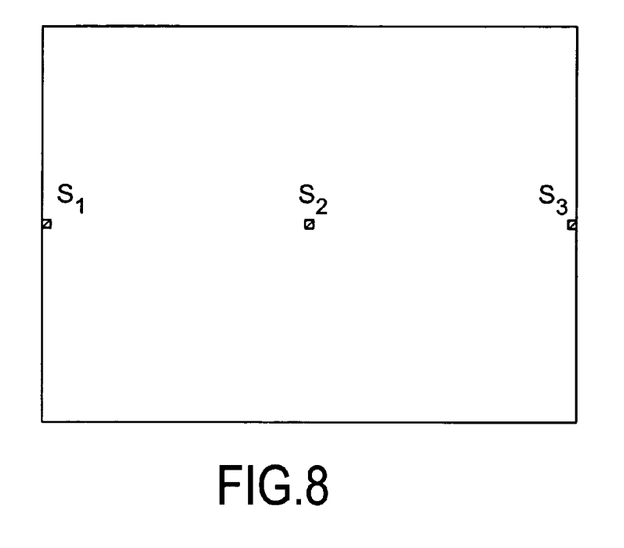
FIG. 8 illustrates an example of black-level measurements where three sampling locations are used.
Figure 9:
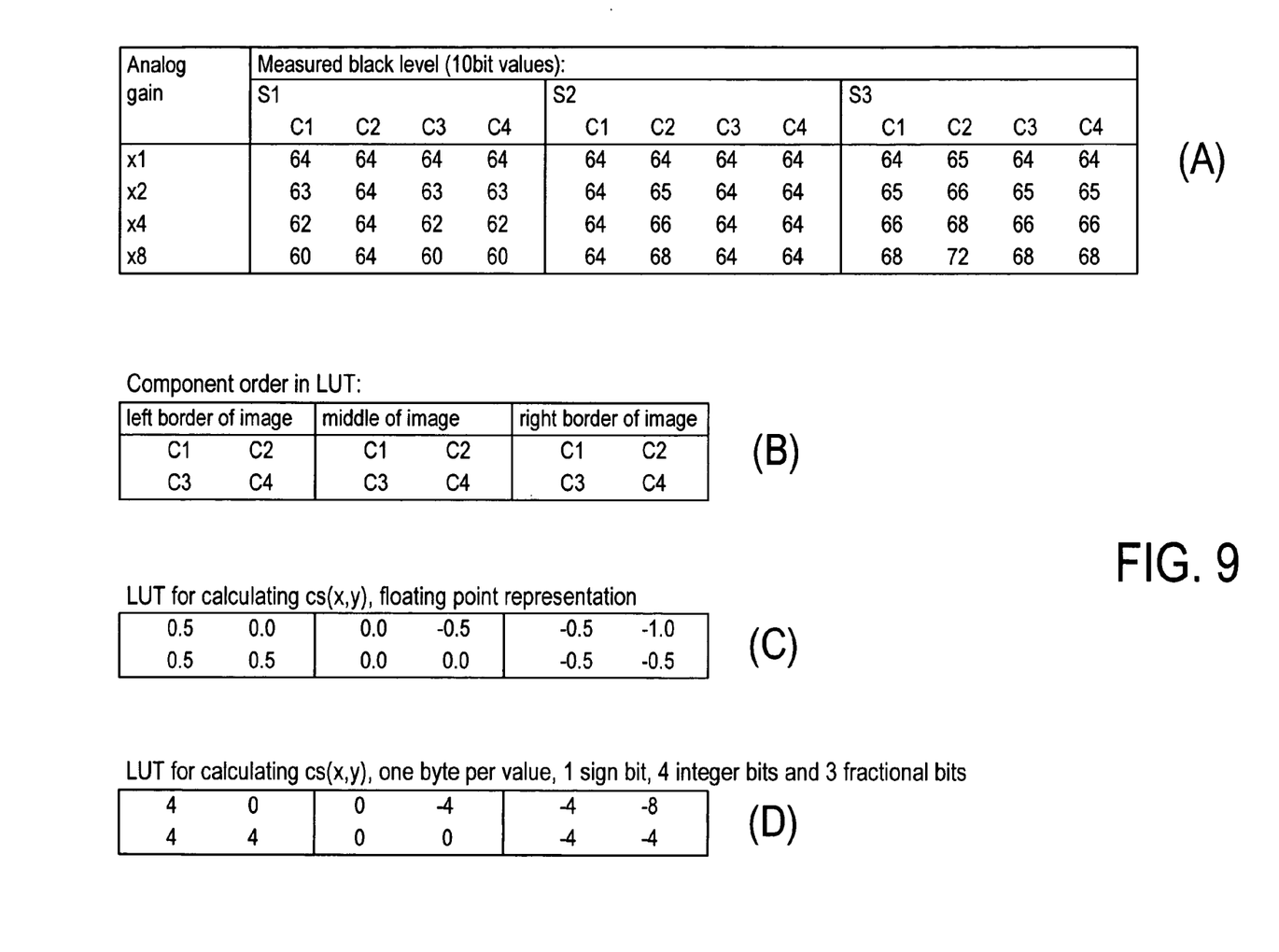
FIG. 9a shows the measurement results.
FIG. 9b shows the color component order in the LUT for calculating the spatial-dependent correction values.
FIG. 9c shows the LUT for calculating the spatial-dependent correction values, where the correction values are expressed in a floating point representation.
FIG. 9d shows the LUT for calculating the spatial-dependent correction values, where the correction values are expressed in bytes.

FIGS. 9a to 10b illustrate how LUTs are generated based on the black level measurements at three sampling locations S1, S2 and S3 as shown in FIGS. 4 and 8. In these LUTs, the target pedestal level is 64 (10 bbp raw data) for all color components at all sampling locations. In order to eliminate temporal noise, spatial averaging within a small neighborhood around each sampling location is used. For simplicity, the black level measurements are carried out by using a single exposure time and set ce$_{ET}$=0 in Equations 3 and 4.

The measured black levels for color components C1, C2, C3 and C4 for each of the sampling locations S1, S2 and S3 are shown at different analog gains at ×1, ×2, ×4 and ×8 are shown in FIG. 9a. The LUTs for calculating cs$_{x,y}$ are shown in FIGS. 9c and 9d. The values in the LUT as shown in FIG. 9c are expressed in a floating point representation, whereas the values in FIG. 9d are expressed in bytes. The color component order for these LUTs is shown in FIG. 9b.

Figure 10:
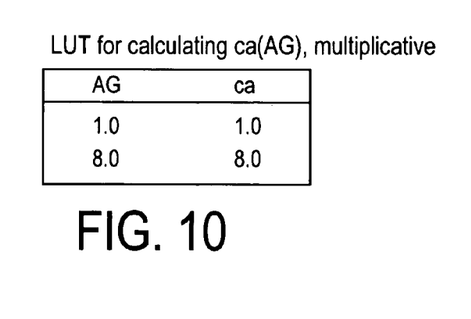
FIG. 10 shows the LUT for calculating the analog gain-dependent correction values.

The LUT for calculating the multiplicative analog gain-dependent correction value ca$_{AG}$ is shown in FIG. 10, similar to the LUT as shown in FIG. 6a, but the analog gain order in the LUT is different. Furthermore, the LUT can be more generic such that each color component may have a different value of ca$_{AG}$. Accordingly, the values of some terms in Equations 2-5 may be different for a different color component.

Figure 11:
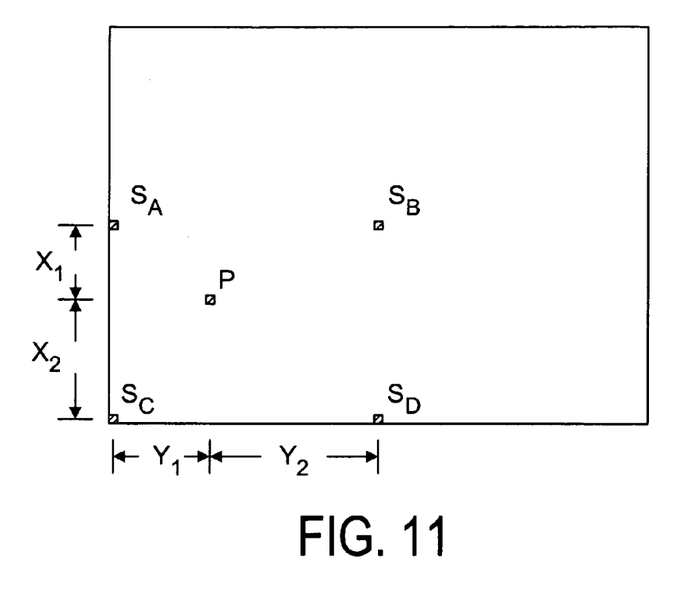
FIG. 11 shows the spatial relation between a pixel location and the surrounding sampling locations for calculating the correction value at the pixel location.

When a pixel location P has four nearest sampling locations $S_A$, $S_B$, $S_C$ and $S_D$ in the surrounding pixel area, as shown in FIG. 11, the correction value or correction offset at the location P can be calculated using the correction values or offsets at each of the sampling locations $S_A$, $S_B$, $S_C$ and $S_D$ as follows:

$$c(P)=[X_2*Y_2*c(A)+X_2*Y_1*c(B)+X_1*Y_2*c(C)+X_1*Y_1*c(D)]/[(X_1+X_2)*(Y_1+Y_2)] \quad (6)$$

where c(P), C(A), C(B), C(C) and c(D) are the correction values at the pixel location P and at the sampling locations $S_A$, $S_B$, $S_C$ and $S_D$, and $X_1$, $X_2$, $Y_1$ and $Y_2$ define the distance from the pixel location P to each of the sampling locations. Equation 6 gives an example of linear interpolation based on the distances in the X and Y axes. Nonlinear and other types of interpolation methods can also be used.

The major advantages of the present invention include the following:

Simple spatial relationship between the LUT and the image;

Relatively low computation power requirement at run time and low memory requirement, as only a small number of sampling locations is required;

No mechanical shutter is required;

Memory requirement does not increase significantly as the image size increases because a larger down scale factor may be used for a larger image.

Although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method, comprising:
   measuring a black level of each of a plurality of color sensing components in an image sensor at least at one sampling location; and
   generating a look-up table based on the black level separately measured from the color sensing components so that black-level correction on the raw image data is based on the look-up table, wherein the raw image data includes image data at different spatial locations of the image sensor and the look-up table comprises information indicative of the spatial locations so that the black-level correction on the raw image data is also based on the information.

2. The method of claim 1, wherein the raw image data is captured at a gain level and the look-up table comprises information indicative of the gain level so that the black-level correction on the raw image data is also based on the information.

3. The method of claim 1, wherein the raw image data is captured at an exposure time and the look-up table comprises information indicative of the exposure time so that the black-level correction on the raw image data is also based on the exposure time.

4. The method of claim 1, further comprising:
   reconstructing an image in an image reconstruction pipeline based on the raw image data, wherein the black-level correction on the image data is carried out in the image reconstruction pipeline.

5. A method, comprising:
   measuring a black level of each of a plurality of color sensing components in an image sensor at least at one sampling location; and
   generating a look-up table based on the black level separately measured from the color sensing components so that black-level correction on the raw image data is based on the look-up table, wherein the raw image data includes image data at different spatial locations of the image sensor and wherein said measuring is carried out at a plurality of sampling locations, and the look-up table is generated based on the black level measured at said plurality of sampling locations so that the black-level correction on the image data at different spatial locations is based on black levels measured at least at some of said plurality of sampling locations.

6. The method of claim 5, wherein the black-level correction on the image data is based on interpolation or extrapolation of the black levels measured at said some sampling locations.

7. An apparatus, comprising:
   a look-up table for storing information indicative of black levels measured at least at one sampling location on an image sensor, wherein the measured black levels include the black level of each of a plurality of color sensing components in the image sensor at the sampling location; and
   a computation module, operatively connected to the look-up table, for retrieving the information so that black-level correction on the raw image data is based on the information, wherein the raw image data includes image data at different spatial locations of the image sensor and the look-up table comprises information indicative of the spatial locations so that the black-level correction on the raw image data is also based on the information.

8. The apparatus of claim 7, wherein the raw image data is captured at a gain level and the look-up table comprises information indicative of the gain level so that the black-level correction on the raw image data is also based on the information.

9. The apparatus of claim 8, wherein the raw image data is captured at an exposure time and the look-up table comprises information indicative of the exposure time so that the black-level correction on the raw image data is also based on the exposure time.

10. A device, comprising:
    an image sensor;
    an optical unit for forming an image on the image sensor;
    a storage medium for storing a look-up table, wherein the look-up table has information indicative of black levels measured at least at one sampling location on the image sensor, wherein the measured black levels include the black level of each of a plurality of color sensing components in the image sensor at the sampling location; and
    a computation module adapted to receive raw image data from the image sensor and to retrieve information from the look-up table so as to carry out black-level correction on the raw image data based on the information, wherein the look-up table comprises information indicative of the spatial locations of pixels from which the raw image data is obtained so that the black-level correction on the raw image data is also based on the information.

11. The device of claim 10, further comprising:
    a gain control module for controlling the analog gain level of the image sensor when the raw image data is captured, wherein the look-up table comprises information indicative of the gain level so that the black-level correction on the raw image data is also based on the information.

12. The device of claim 10, further comprising:
    a time control module for setting an exposure time for capturing the raw image data, wherein the look-up table comprises information indicative of the exposure time so that the black-level correction on the raw image data is also based on the exposure time.

13. The device of claim 10, further comprising:
    an image reconstruction pipeline for reconstructing an image based on the raw image data, wherein the black-level correction on the image data is carried out in the image reconstruction pipe line.

14. A device comprising:
    an image sensor;
    an optical unit for forming an image on the image sensor;
    a storage medium for storing a look-up table, wherein the look-up table has information indicative of black levels measured at least at one sampling location on the image sensor, wherein the measured black levels include the black level of each of a plurality of color sensing components in the image sensor at the sampling location; and
    a computation module adapted to receive raw image data from the image sensor and to retrieve information from the look-up table so as to carry out black-level correction on the raw image data based on the information, wherein the raw image data includes image data at different spatial locations of the image sensor and the black levels are measured at a plurality of sampling locations, and the look-up table is generated based on the black levels measured at said plurality of sampling locations so that the black-level correction on the image data at different spatial locations is based on black levels measured at least at some of said plurality of sampling locations.

15. The device of claim 14, wherein the black-level correction on the image data is based on interpolation or extrapolation of the black levels measured at said some sampling locations.

* * * * *